US010288720B1

(12) United States Patent
Adolf et al.

(10) Patent No.: US 10,288,720 B1
(45) Date of Patent: May 14, 2019

(54) VEHICLE SENSOR ALIGNMENT USING PHOTOGRAMMETRY

(71) Applicant: Waymo LLC, Mountain View, CA (US)

(72) Inventors: Brian John Adolf, San Mateo, CA (US); Kenneth Ryan Loo, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 694 days.

(21) Appl. No.: 14/986,063

(22) Filed: Dec. 31, 2015

(51) Int. Cl.
*G01S 7/40* (2006.01)
*G01S 13/93* (2006.01)
*G01C 11/00* (2006.01)

(52) U.S. Cl.
CPC ............ *G01S 7/4026* (2013.01); *G01C 11/00* (2013.01); *G01S 13/931* (2013.01)

(58) Field of Classification Search
CPC ..................................................... G01S 7/4026
USPC .......................................................... 342/70
See application file for complete search history.

(56) References Cited

U.S. PATENT DOCUMENTS

| 6,711,475 | B2  |   | 3/2004 | Murphy |
|-----------|-----|---|--------|--------|
| 7,725,258 | B2  |   | 5/2010 | Smitherman |
| 9,568,592 | B1  | * | 2/2017 | Brown ................... G01S 7/4004 |
| 2010/0036393 | A1 | * | 2/2010 | Unsworth .............. G01D 5/262 |
|  |  |  |  | 606/130 |
| 2014/0046589 | A1 |  | 2/2014 | Metzler et al. |
| 2015/0106004 | A1 |  | 4/2015 | Taylor et al. |

FOREIGN PATENT DOCUMENTS

WO      2015116993      8/2015

* cited by examiner

*Primary Examiner* — Peter M Bythrow
*Assistant Examiner* — Helena H Seraydaryan
(74) *Attorney, Agent, or Firm* — McDonnell Boehnen Hulbert & Berghoff LLP

(57) ABSTRACT

A method is provided for mounting a plurality of radar units to a vehicle. The method involves determining, for each radar unit, a measured pitch direction and a measured yaw direction based on data obtained using a photogrammetry system. The method also involves determining yaw angles between at least two of the radar units based on at least one of the measured yaw directions. The method also involves determining, for each radar unit, a pitch offset and a yaw offset. The method also involves adjusting at least one of the radar units based on at least one of the determined pitch offsets and at least one of the determined yaw offsets. Also provided is a device for performing the method.

20 Claims, 5 Drawing Sheets

VEHICLE SENSOR ALIGNMENT USING PHOTOGRAMMETRY

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example vehicle radar systems may be configured to operate at an electromagnetic wave frequency of 77 Giga-Hertz (GHz), which corresponds to a millimeter (mm) wave electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

Disclosed herein are embodiments that relate to vehicle sensor alignment using photogrammetry. In one example, a method is provided that involves mounting a plurality of radar units to a vehicle. The method also involves determining, for each radar unit, a measured pitch direction and a measured yaw direction based on data obtained using a photogrammetry system. The method also involves determining yaw angles between at least two of the radar units. A particular yaw angle between two particular radar units may be based on a difference between the measured yaw directions of the two particular radar units. The method also involves determining, for each radar unit, a pitch offset based on a difference between a target pitch direction and the measured pitch direction of the radar unit. The method also involves determining, for each radar unit, a yaw offset based at least in part on a difference between a target yaw angle and one of the determined yaw angles. The method also involves adjusting orientation of at least one of the radar units based on at least one of the determined pitch offsets and at least one of the determined yaw offsets.

In another example, a device is provided that includes data storage storing data generated by a photogrammetry system. The data may indicate measured directions of a plurality of radar units mounted to a vehicle. The device also includes a computing unit configured to perform operations comprising using the data in the data storage to determine, for each radar unit, a measured pitch direction and a measured yaw direction. The operations also comprise determining yaw angles between at least two of the radar units. A particular yaw angle between two particular radar units may be based on a difference between the measured yaw directions of the two particular radars. The operations also comprise determining, for each radar unit, a yaw offset based at least in part on a difference between a target yaw angle and one of the determined yaw angles. The operations also comprise determining, for each radar unit, a pitch offset based on a difference between a target pitch direction and the measured pitch direction of the radar unit. The operations also comprise providing mounting instructions for mounting the radar units. The mounting instructions are based on the determined pitch offsets and the determined yaw offsets.

In yet another example, a computing device is provided. The computing device may include a processor and a computer readable medium having stored thereon program instructions that when executed by the processor cause the computing device to perform functions. The functions include obtaining data generated by a photogrammetry system. The data may pertain to a plurality of radar units mounted to a vehicle. The functions also comprise determining, based on the obtained data, measured yaw angles between at least two of the radar units. A particular measured yaw angle between two particular radar units may be based on a difference between yaw directions measured for the two particular radar units. The functions also comprise determining, for each radar unit, a yaw offset based at least in part on a difference between a target yaw angle and one of the measured yaw angles. The functions also comprise determining, for each radar unit, a measured pitch direction based on the obtained data. The functions also comprise determining, for each radar unit, a pitch offset based on a difference between a target pitch direction and the measured pitch direction.

In still another example, a system is provided that includes means for mounting a plurality of radar units to a vehicle. The system also includes means for determining, for each radar unit, a measured pitch direction and a measured yaw direction based on data obtained using a photogrammetry system. The system also includes means for determining yaw angles between at least two of the radar units. A particular yaw angle between two particular radar units may be based on a difference between the measured yaw directions of the two particular radar units. The system also includes means for determining, for each radar unit, a pitch offset based on a difference between a target pitch direction and the measured pitch direction of the radar unit. The system also includes means for determining, for each radar unit, a yaw offset based at least in part on a difference between a target yaw angle and one of the determined yaw angles. The system also includes means for adjusting orientation of at least one of the radar units based on at least one of the determined pitch offsets and at least one of the determined yaw offsets.

The foregoing summary is illustrative only and is not intended to be in any way limiting. In addition to the illustrative aspects, embodiments, and features described

DETAILED DESCRIPTION

Figure 1:
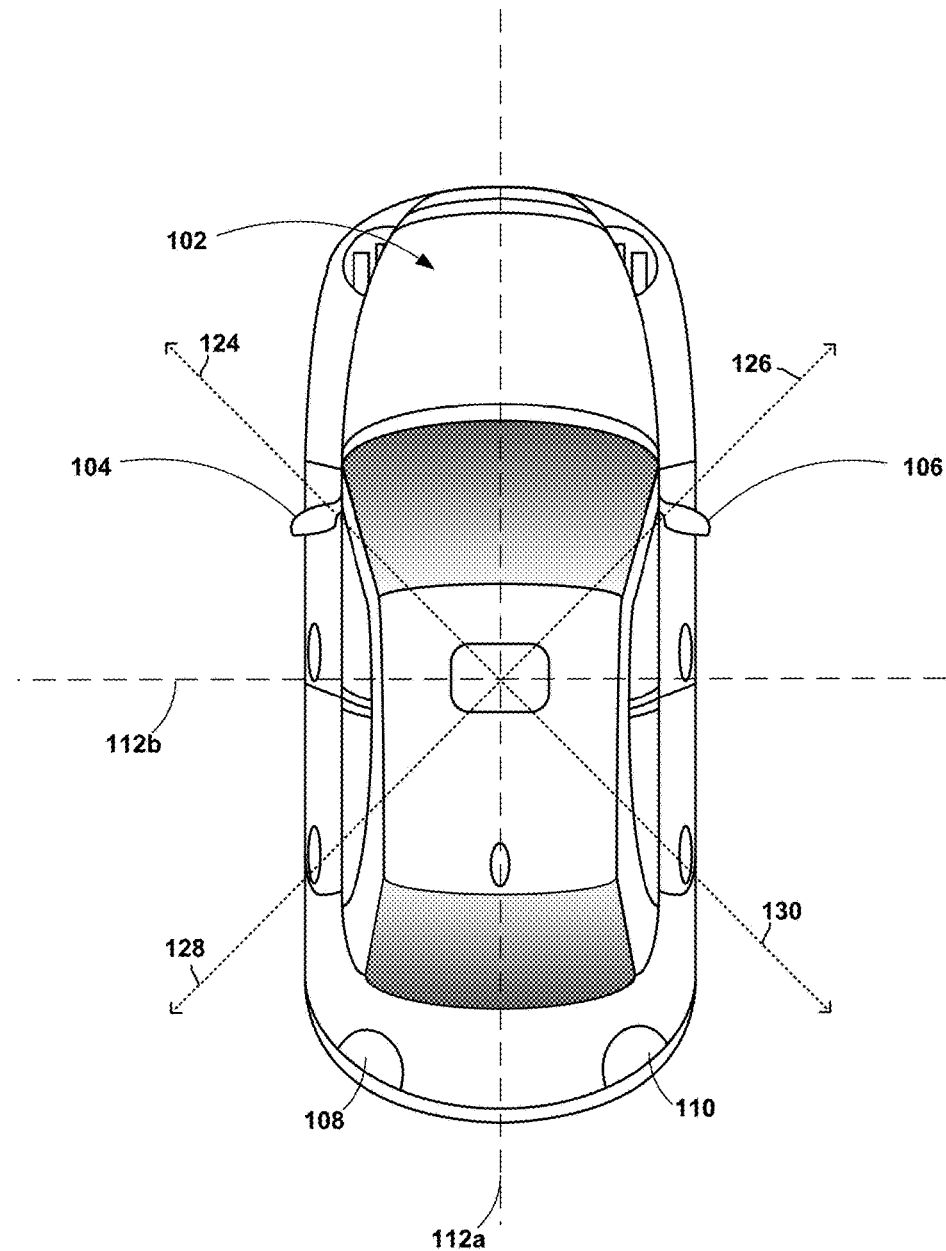
FIG. 1 illustrates a layout of radar sectors, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to systems, devices, and methods for vehicle sensor alignment using photogrammetry. Although example embodiments herein may involve radar sensors, the methods and systems herein can be used with any vehicle-mounted sensors, such as LIDARs, cameras, motion sensors, or microphones, among other possibilities. Vehicular radar systems may feature multiple radar units with each radar unit having an associated field of view. Conventional approaches for alignment of the various radar units can be time-consuming, labor-intensive procedures involving precise measurements and expensive tools. The devices and methods presented herein may allow precise alignment of radar units in a more time efficient and equipment-efficient manner.

Traditionally, vehicular radar systems have featured a single radar unit looking in a forward direction. These traditional radar systems would also typically only direct the radar beam in a single direction. When a vehicle has only a single radar unit with a beam that only was directed in a single direction, precise placement of the radar unit may be less of a concern than for systems using multiple radar units with steerable beams. For example, a traditional vehicular radar system may only be configured to detect the presence of another vehicle directly in front of the vehicle having the radar system. Thus, as long as a radar beam generally points in the forward direction, the traditional radar system may be able to detect the vehicle.

More advanced radar systems may be used with a vehicle in order to obtain a wider field of view than just directly in front of the vehicle. For example, it may be desirable either for a radar to be able to steer a radar beam or for a vehicle to feature multiple radar units pointing in different directions. Additionally, the radar units may be configured to detect more than just other vehicles located directly in front of the vehicle with the radar unit. Thus, the radar system may be able to interrogate different regions than just the region in front of the car. In some examples, multiple radar units may be combined with steerable radar beams to further increase the interrogation region and the imaging resolution of the vehicular radar system.

An example radar system for use with the present disclosure may include a multi-sector 90-degree field of view radar antenna architecture that may enable an antenna to both scan across approximately 90 degrees of the azimuth plane (e.g., the horizontal plane, the yaw plane, etc.) while also being mountable on various surfaces of a vehicle. Having a radar antenna with a 90 degree field of view may enable a radar system to scan a full 360 azimuth (yaw) plane by having four radar units each configured to scan one 90 degree non-overlapping sector. Therefore, the example disclosed radar system may be able to steer a radar beam to interrogate the entire region in the azimuth (yaw) plane of the vehicle. For example, four such radars located on four corners of a car may provide a full 360 degree coverage around the car. Such a system may aid in autonomous driving of a vehicle.

When each radar unit can scan or span a 90 degree region, placing 4 radar units on a vehicle may enable the vehicle to scan a beam over the full 360 azimuth (yaw) plane. Each of the four radar units may be configured to scan a beam over one sector (i.e. one quarter of the azimuth/yaw plane) and thus the entire plane may be scanned by the combination of the four radar units. In various examples, the placement of the radar units may be adjusted depending on the specific vehicle, the requirements of the radar system, or other design criteria. In some additional examples, the radar units may be configured to scan a region of an angular width that is not 90 degrees. For example, some radar units may scan 30 degrees, 120 degrees, or another angle. Further, in some examples, the radar units on the vehicle may scan less than the full 360 azimuth (yaw) plane.

In some examples, the radar sectors may be defined based on where the radar units may be mounted on the vehicle. In one example, one radar unit may be mounted in each of the side mirrors of the vehicle. The other two radar units may be mounted adjacent to or behind the taillights of the vehicle. In this example, the quadrants may be defined based on axes where one axis aligns with the direction of vehicular motion (e.g., front to back) and the other axis aligns with the middle of the vehicle from left to right. In another example, the radar units may be mounted in order to have one pointing forward, one pointing backward, and one pointing to each side. In this second example, the axes of the quadrants may be at a 45 degree angle to the direction of motion of the vehicle. Additionally, the radar unit may be mounted on top of the vehicle.

A multi-sector 90-degree field of view radar antenna architecture could also be able to steer the radar beams emitted from each radar unit. The radar beams may be steered by the radar units in various ways. For example, in some embodiments, the radar units may be able to steer the beam in an approximately continuous manner across the 90 degree field of view for the respective antenna or the radar units may be configured with sectoral sub beams spanning the 90 degrees. In other embodiments, the radar units may be able to steer the radar beam to predetermined directions within the 90 degree field of view for the respective antenna.

FIG. 1 illustrates an example layout of radar sectors for a vehicle 102. As shown in FIG. 1, each of the radar sectors may have an angular width approximately equal to the scanning range of the radar units (as will be described with respect to FIG. 2). For example, the sectors of FIG. 1 divide the azimuth (yaw) plane around the vehicle 102 into 90 degree sectors. However, in examples where the radar units are configured to scan a radar beam over a different angle than 90 degrees, the width and number of sectors may change.

As shown in FIG. 1, the radar sectors may align with the axes (112a and 112b) of the vehicle 102. For example, there may be a front left, front right, rear left, and rear right sector defined by the midpoints of the vehicle 102. Because each sector corresponds to one radar unit, each radar unit may be configured to scan across one sector. Further, because each example radar unit of FIG. 1 has a scanning angle of approximately 90 degrees, each radar unit scans a region that approximately does not overlap with the scanning angle of any other radar unit. The layout of radar sectors shown in FIG. 1 is one example. Other possible layouts of radar sectors are possible as well.

In order to achieve radar sectors defined by the midpoints of the vehicle 102, each radar unit may be mounted at a 45 degree angle with respect to the two axes of the vehicle 102, such that the radar unit has a yaw pointing direction aligned approximately between the two axes (112a and 112b). By mounting the radar units at a 45 degree angle (e.g., the yaw direction) with respect to the two axes of the vehicle 102, a 90 degree scan of the radar unit would scan from one vehicle axis to the other vehicle axis. For example, a radar unit mounted at a 45 degree angle to the axes in side mirror unit 104 (e.g., having yaw direction 124) may be able to scan the front left sector (i.e. from the vertical axis 112a through the front of the vehicle 102 to the axis 112b that runs through the side of the vehicle). An additional radar unit may be mounted at a 45 degree angle to the axes in side mirror unit 106 (e.g., having yaw direction 126) may be able to scan the front right sector. In order to scan the back right sector, for example, a radar unit may be mounted at or near taillight unit 110 (e.g., having yaw direction 130). Additionally, in order to scan the back left sector, a radar unit may be mounted at or near taillight unit 108 (e.g., having yaw direction 128), for example. The radar unit placements shown in FIG. 1 are merely one example. In various other examples, the radar units may be placed in other locations, such as on top of the vehicle, or within or behind other vehicle components. Further, the sectors may also be defined differently in various embodiments. In one example, the sectors may be at a 45 degree angle with respect to the vehicle. In this example, one radar unit may face forward, another backward, and the other two to the sides of the vehicle.

In some examples, all the radar units of vehicle 102 may be configured with the same scanning angle. The azimuth (yaw) plane around the vehicle is equal to a full 360 degrees. Thus, for example, if each radar unit is configured with the same scanning angle, then the scanning angle for the radar units would be equal to approximately 360 divided by the number of radar units on the vehicle. Thus, for full azimuth (yaw) plane scanning, a vehicle 102 with one radar unit would need that radar unit to be able to scan over the full 360 degrees.

If the vehicle 102 had two radar units, each could scan approximately 180 degrees, for example. With three radar units, each could be configured to scan 120 degrees, for example. With four radar units, as shown in FIG. 1, each may scan approximated 90 degrees. Five radar units may be configured on the vehicle 102 and each may be able to scan 72 degrees. Further, six radar units may be configured on the vehicle 102 and each may be able to scan approximately 60 degrees.

The number of radar units may be chosen based on a number of criteria, such as ease of manufacture of the radar units, vehicle placement, or other criteria. For example, some radar units may be configured with a planar structure. The planar radar unit may be mountable at various positions on a vehicle. For example, a vehicle may have a dedicated radar housing mounted on the top of the vehicle. The radar housing may contain various radar units. However, in other embodiments, radar units may be placed within the vehicle structure.

When radar units are located within the vehicle structure, each may not be visible from outside the vehicle without removing parts of the vehicle. Thus, adding radar units to the vehicle may not alter the vehicle aesthetically, cosmetically, or aerodynamically. For example, radar units may be placed under vehicle trim work, under bumpers, under grills, within housings for lights, within side mirrors, or other locations as well. In some embodiments, it may be desirable to place radar units in positions where the object covering the radar unit is at least partially transparent to radar wavelengths. For example, various plastics, polymers, and other materials may form part of the vehicle structure and cover the radar units, while allowing the radar signal to pass through.

Additionally, in some embodiments, the radar units may be configured with different scanning ranges for different radar units. For example, in some embodiments a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal (yaw) scanning. For example, a vehicle may have 3 radar units that each scan over 100 degrees and a fourth radar unit that scans over 60 degrees. Thus, the radar units may be able to scan the full azimuth (yaw) plane, but the scanning sectors may not be equal in angular size.

Figure 2:
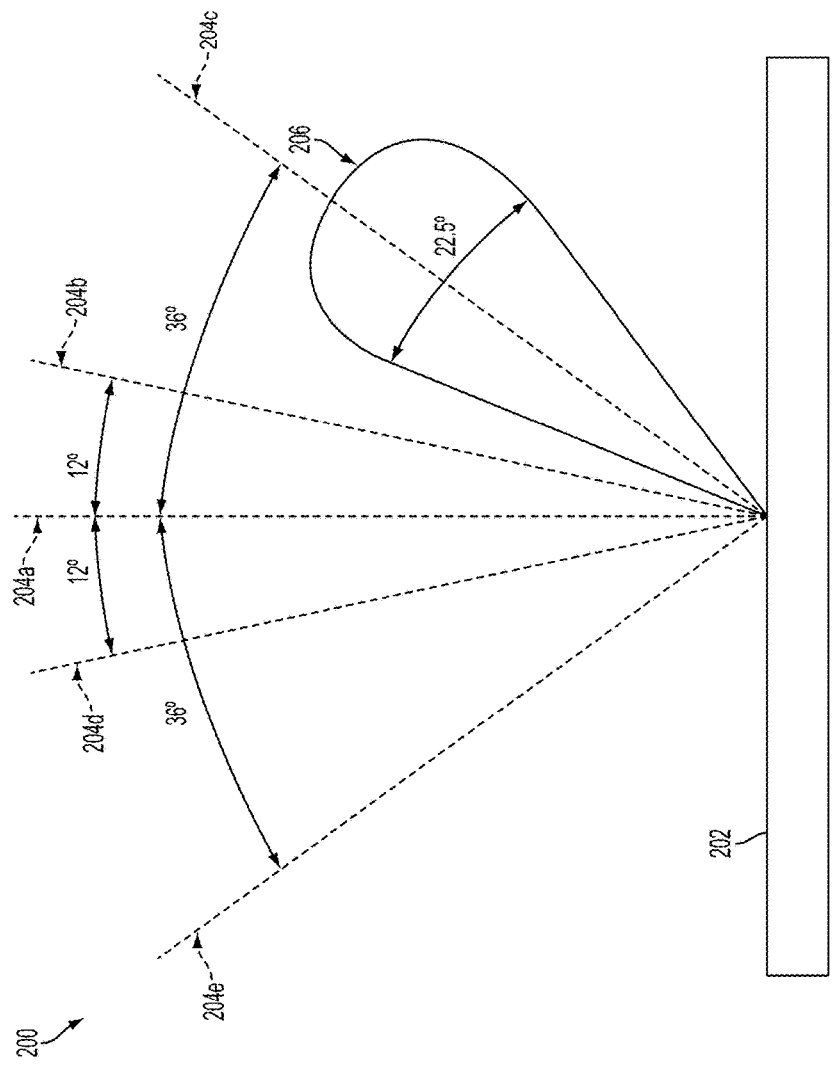
FIG. 2 illustrates beam steering for a sector for a radar unit, according to an example embodiment.

FIG. 2 illustrates example beam steering for a sector for a radar unit 200. The radar unit 200 may be configured with a steerable beam, i.e., the radar unit 200 may be able to control a direction in which the beam is radiated. By controlling the direction in which the beam is radiated, the radar unit 200 may be able to direct radiation in a specific direction in order to determine radar reflections (and thus objects) in that direction. In some embodiments, the radar unit 200 may be able to scan a radar beam in a continuous manner across the various angles of the azimuth (yaw) plane. In other embodiments, the radar unit 200 may be able to scan the radar beam in discrete steps across the various angles of the azimuth (yaw) plane.

The example radar unit 200 in FIG. 2 has a radar beam 206 that can be steered across a plurality of different angles. As shown in FIG. 2, the radar beam 206 may have a half-power beamwidth of approximately 22.5 degrees. The half-power beamwidth describes the width, measured in degrees, of a main lobe of the radar beam 206 between two points that correspond to half the amplitude of the maximum of the radar beam 206. In various embodiments, the half-power beamwidth of the radar beam 206 may be different than 22.5 degrees. Additionally, in some embodiments, the half-power beamwidth of the radar beam 206 may change depending on the angle at which the radar beam 206 is pointed. For example, the half-power beamwidth of the radar beam 206 may be narrower when the radar beam 206 is pointed more closely to the orthogonal 204a (i.e. broadside) direction to the radiating surface and widen and the radar beam 206 is steered away from the orthogonal direction 204a.

In some examples, the orthogonal 204a direction can be described as the pointing or reference direction of the radar unit 202. For example, if the yaw or azimuthal plane of a vehicle using radar unit 202 is substantially parallel to the page of FIG. 2, then the component of the orthogonal direction 204a substantially parallel to the page (as shown) could be described as the yaw direction of the radar unit 202. Further, in this example, the component of the orthogonal direction 204a along a plane substantially perpendicular to the page and also substantially parallel to the orthogonal direction 204a could be described as the pitch direction or the elevational direction of the radar unit 202. Thus, in this example, such reference directions (e.g., yaw direction and pitch direction) may indicate the orientation of the radar unit 202 relative to the vehicle on which the radar unit 202 is mounted.

Continuing with the example shown in FIG. 2, the radar beam may be able to be steered to four different angles. The steering angle may be measured with respect to the orthogonal 204a (i.e. broadside) direction to the radiating surface. The beam may be steered to +36 degrees at 204c and −36 degrees at 204e. Also, the beam may be steered to +12 degrees at 204b and −12 degrees at 204d. The four different angles may represent the discrete angles to which the radar beam 206 may be steered. In some additional examples, the radar beam may be able to be steered to two angles simultaneously. For example, the radar beam may be steered to both +12 and −12 degrees at the same time. This may result in a beam that is overall steered in the direction of the sum of the angles (e.g. −12+12=0, thus the beam in this example would be in the broadside direction 204a). However, when a radar beam is steered at two directions at once, the half-power beamwidth of the radar beam may be widened. Thus, a radar resolution may decrease.

By steering the radar beam 206 to each of angles 204b-204e, the full 90 degree field of view can be scanned. For example, when the radar beam 206 is steered to +36 degrees 204c, the half-power beamwidth of the radar beam 206 will cover from +47.25 degrees to +24.75 degrees (as measured from the broadside direction 204a). Additionally, when the radar beam 206 is steered to −36 degrees 604e, the half-power beamwidth of the radar beam 206 will cover from −47.25 degrees to −24.75 degrees. Further, when the radar beam 206 is steered to +12 degrees 204b, the half-power beamwidth of the radar beam 206 will cover from +23.25 degrees to +0.75 degrees. And finally, when the radar beam 206 is steered to −12 degrees 204d, the half-power beamwidth of the radar beam 206 will cover from −23.25 degrees to −0.75 degrees. Thus, the radar beam 206 will effectively be able to scan (e.g., by selectively enabling or disabling the four beams spanning the angular width) from −47.25 to +47.25 degrees, covering a range of 95 degrees. It is noted that the number of steering angles, the direction of the steering angles, and the half-power beamwidth of the radar beam 206 may be varied depending on the specific example.

For example, and further discussed below, a radar beam of a radar unit may be configured to only scan a 60 degree region. If a radar unit can scan a 60 degree region, six radar units may be used to scan a full 360 azimuth (yaw) plane. However, if the radar unit can scan 90 degrees, four radar units may scan the full 360 azimuth (yaw) plane.

Figure 3:
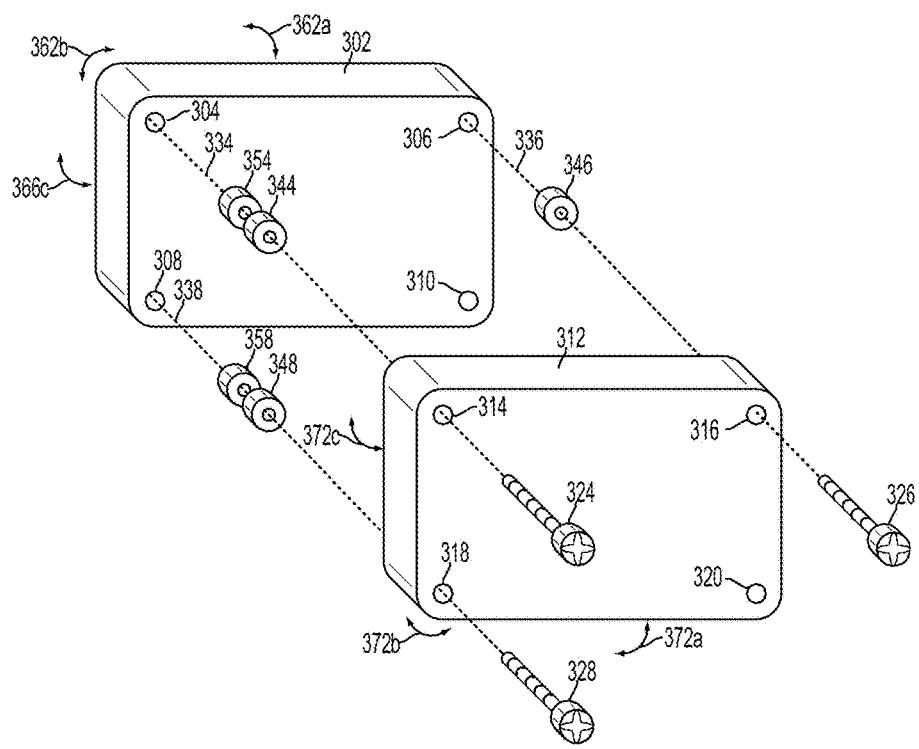
FIG. 3 illustrates a block diagram for mounting a radar unit, according to an example embodiment.

FIG. 3 illustrates mounting a radar unit 312 to a mounting structure 302, in accordance with at least some embodiments herein. The mounting structure 302 is one example way the various radar units could be mounted to a vehicle. However in some embodiments, the radar unit 312 and the mounting structure 302 may be integrated as one unit and not separate components as shown in FIG. 3. Further, in some embodiments, the various components shown in FIG. 3 may have different dimensions or shapes than those shown.

A mounting structure may be located at each location where a radar unit may be coupled to a vehicle. For example, each radar unit mounting location (such as locations 104, 106, 108, and 110 of FIG. 1) may have a mounting structure, similar to the mounting structure 302, to which a radar unit may be mounted. As shown in FIG. 3, the mounting structure 302 may include mounting holes 304, 306, 308, and 310 configured to both align the radar unit 312 when mounted as well as allow the radar unit to be coupled to the mounting structure 302 with attachment devices such as adhesives, bolts, washers, spherical washers, spherical nuts, shims, and/or screws, among other possibilities.

For example, as shown, the radar unit 312 may include mounting holes 314, 316, 318, and 320. Thus, as shown, bolts 324, 326, 328 could be positioned (or fastened), respectively, through holes 314, 316, 318 of the radar unit along dotted lines 354, 356, 358 and into (or through) holes 304, 306, and 308 of the mounting structure. Through this process, for example, the radar unit 312 could be mounted onto the mounting structure 302 that is included in the vehicle in line with the discussion above.

Alternatively or additionally, in some examples, more or fewer components than those shown could be used to couple the radar unit 312 with the mounting structure 302. In one example, another bolt (not shown) could be positioned or fastened through holes 320 and 310 similarly to bolts 324, 326, and 328. In another example, one or more spherical washers (not shown) and/or spherical nuts (not shown) could be positioned between the radar unit 312 and one or more of shims 344, 346, 348. A spherical washer may be a washer having a curved surface configured to align with a corresponding curved surface of a spherical nut. For instance, a spherical nut (not shown) could be positioned along dotted line 334 between radar unit 312 and shim 344, and a spherical washer (not shown) could be positioned between the spherical nut and shim 344. With such arrangement, for example, an angle between dotted line 334 (e.g., path of bolt) and the spherical nut (not shown) could vary within a threshold range of angles, as the curved surface of the spherical washer (not shown) can slide along the curved surface of the spherical nut (not shown), thereby reducing the likelihood of binding between bolt 324 and shim 344. Other example arrangements that involve more or fewer fastening components than those shown are possible as well (e.g., spherical washer positioned between shim 344 and mounting structure 302, etc.).

In the example shown in FIG. 3, for each bolt, one or more shims could be positioned along the path of the bolt between radar unit 312 and mounting structure 302. A shim (e.g., washer, wedge, etc.) could be made from any solid material and can be used to align components, fit components, or mitigate damage caused by friction between components (e.g., friction between radar unit 312 and mounting structure 302). For example, FIG. 3 shows shims 344 and 354 positioned between the radar unit 312 and the mounting structure 302 along dotted line 334 of the bolt 324. Thus, bolt 324 could be fastened through shims 344, 354 and into hole 304. Similarly, a shim 346 is positioned along dotted line 336 of bolt 326, and shims 348, 358 are positioned along dotted line 338 of bolt 328. Other arrangements and configurations are possible as well for mounting radar unit 312 to mounting structure 302.

As noted above, when mounting structure 302 is disposed on a vehicle such as the vehicle 102 of FIG. 1, the orientation of mounting structure 302 could vary due to manufacturing or assembly differences between different vehicles. For example, the orientation of mounting structure 302 may vary in terms of pitch (elevational) direction 362a, roll direction 362b, and/or yaw (azimuthal) direction 362c along the respective arrows shown in FIG. 3. In some embodiments, it may be desirable for a radar unit to be mounted within a threshold range around a desired direction. As an example, each of pitch direction 372a, roll direction 372b, and/or yaw direction 372c of radar unit 312 may be associated with a threshold range of ±1 degree from the desired pitch direction, roll direction, and/or yaw direction. Therefore, it may be desirable to adjust or offset pitch direction 372a, roll direction 372b, and/or yaw direction 372c of radar unit 312 relative to, respectively, pitch direction 362a, roll direction 362b, and/or yaw direction 362c of mounting structure 302.

Within examples herein, these adjustments or offsets could be achieved by varying the quantity of shims used with one or more of the bolts. For example, as shown, bolt 326 is coupled to only one shim 346, whereas bolts 324 and 328 are coupled to two bolts each (e.g., shims 344 and 354 for bolt 324, and shims 348 and 358 for bolt 328). In this example, the radar unit 312 would have a yaw offset relative to the mounting structure 302.

Thus, in some embodiments, the present disclosure may provide for varying the quantities of shims used for each bolt used to couple a radar unit to a mounting structure. By doing so, for example, a desired yaw offset or pitch offset between the radar unit and the mounting structure could be achieved, and the radar unit could be pointed towards a desired direction in line with the discussion above.

In one example, to adjust the yaw direction 372c of radar unit 312, more or fewer shims could be used for bolt 326 than the one shim 346 shown in FIG. 3. Alternatively or additionally, for instance, more or fewer shims could be used for both bolts 324, 328 than those shown in FIG. 3.

In another example, to adjust the pitch direction 372a, more or fewer shims could be used for bolt 328 than the two shims 348, 358 shown in FIG. 3. Alternatively or additionally, for instance, more or fewer shims could be used for both bolts 324, 326 than those shown in FIG. 3.

In some embodiments, a computing device may implement the disclosed methods as computer program instructions encoded on a non-transitory computer-readable storage media in a machine-readable format, or on other non-transitory media or articles of manufacture. The computing device may be integrated with a photogrammetry system or it may be a separate computing device in communication with the photogrammetry system.

Figure 4:
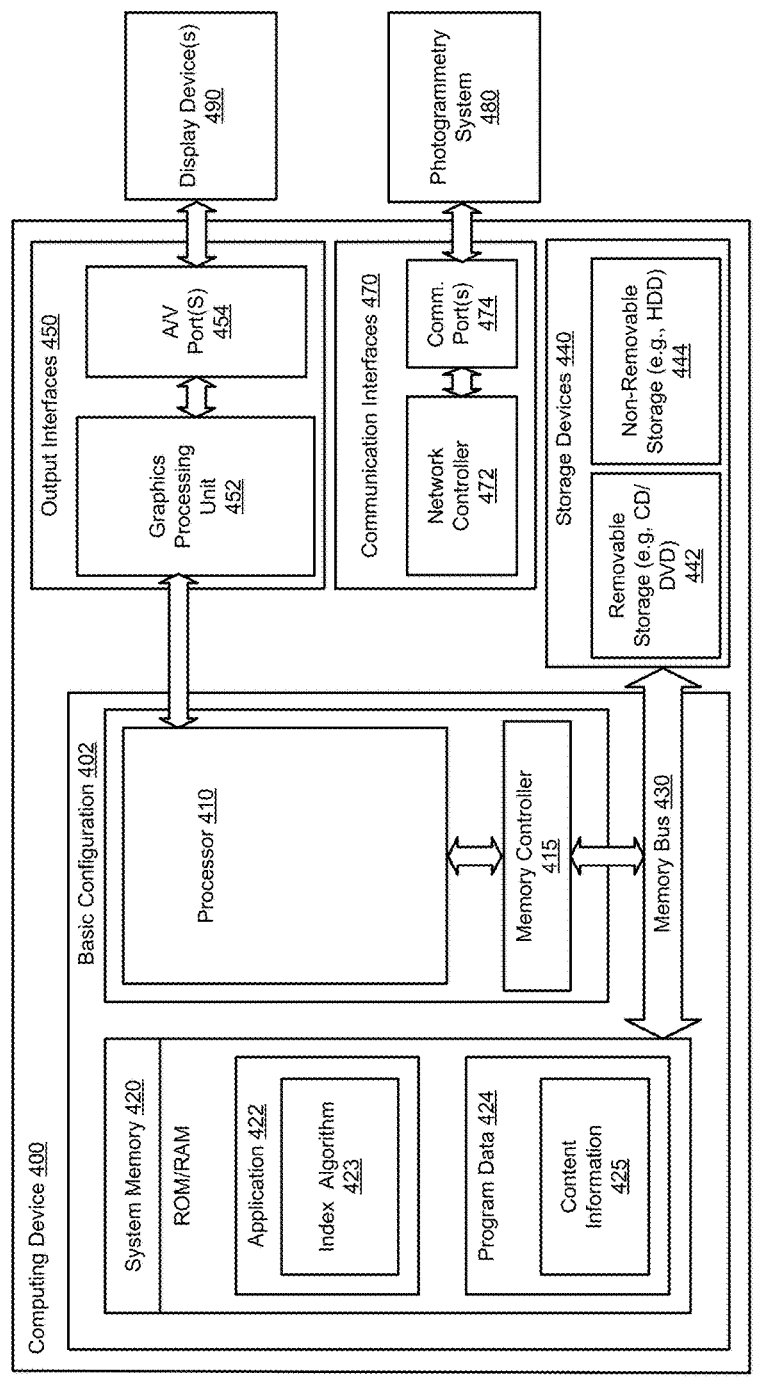
FIG. 4 illustrates a computing device, according to an example embodiment.

FIG. 4 illustrates a functional block diagram of a computing device 400 in communication with a photogrammetry system 480, according to an example embodiment. The computing device 400 can be used to perform some or all of the functions discussed above in connection with FIG. 5.

The computing device 400 can be or include various types of devices, such as, for example, a server, personal computer, mobile device, cellular phone, or tablet computer. In a basic configuration 402 (e.g., computational unit, etc.), the computing device 400 can include one or more processors 410 and system memory 420. A memory bus 430 can be used for communicating between the processor 410 and the system memory 420. Depending on the desired configuration, the processor 410 can be of any type, including a microprocessor (µP), a microcontroller (µC), or a digital signal processor (DSP), among others. A memory controller 415 can also be used with the processor 410, or in some implementations, the memory controller 415 can be an internal part of the processor 410.

Depending on the desired configuration, the system memory 420 can be of any type, including volatile memory (such as RAM) and non-volatile memory (such as ROM, flash memory). The system memory 420 may include program instructions that, when executed by the processor 410, may cause the device 400 to perform functions described herein (e.g., functions of the method 500 in FIG. 5). For example, the functions may include using data stored in data storage 440 to determine a measured pitch direction and a measured yaw direction for each radar unit coupled to a vehicle, in line with the discussion above. Thus, for example, the data stored in data storage 440 may include data generated by photogrammetry system 480, such as the measured pitch and yaw directions, or measured yaw angles between radar units mounted to a vehicle (e.g., radar units 202 and 312 of FIGS. 2 and 3).

The system memory 420 can include one or more applications 422 and program data 424. The application(s) 422 can include an index algorithm 423 that is arranged to provide inputs to the electronic circuits. The program data 424 can include content information 425 that can be directed to any number of types of data. The application 422 can be arranged to operate with the program data 424 on an operating system. The program data 424, for example, may include the data generated by the photogrammetry system 480, in line with the discussion above. In one example, the program instructions, when executed by processor 410, could cause the device 400 to receive the data generated by the photogrammetry system 480 via communication interface 470, and could cause the device 400 to store the received data in data storage 440.

The computing device 400 can have additional features or functionality, and additional interfaces to facilitate communication between the basic configuration 402 and any devices and interfaces. For example, data storage devices 440 can be provided including removable storage devices 442, non-removable storage devices 444, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other non-transitory computer readable medium that can be used to store the desired information and that can be accessed by the computing device 400.

The computing device 400 can also include output interfaces 450 that can include a graphics processing unit 452, which can be configured to communicate with various external devices, such as display devices 490 or speakers by way of one or more A/V ports or a communication interface 470. The communication interface 470 can include a network controller 472, which can be arranged to facilitate communication with one or more other computing devices, such as photogrammetry system 480, over a network communication by way of one or more communication ports 474. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 can also be implemented as a personal computer including both laptop computer and non-laptop computer configurations.

The disclosed methods can be implemented as computer program instructions encoded on a non-transitory computer-readable storage medium in a machine-readable format, or on other non-transitory media or articles of manufacture. The computer program product includes a computer program for executing a computer process on a computing device, arranged according to some disclosed implementations.

The one or more programming instructions can be, for example, computer executable instructions. A computing device (such as the computing device 400 of FIG. 4) can be configured to provide various operations in response to the programming instructions conveyed to the computing device by one or more of the computer-readable medium, the computer recordable medium, and the communications medium.

Photogrammetry system 480 may include one or more devices as well as one or more software components configured to provide data to the computing device 400 via the communication interface 470. The data may indicate measured pitch directions, roll directions, and/or yaw directions of a plurality of radar units (or mounting structures) coupled to a vehicle such as the vehicle 102 of FIG. 1. For example, the photogrammetry system 480 may include one or more imaging devices (e.g., cameras, depth cameras, 3D cameras, etc.) and/or one or more remote sensing devices (e.g., Infrared sensors, ultrasound sensors, etc.), and may use these devices to detect, measure, or record 3D orientations of various surfaces or objects on or around a vehicle such as vehicle 102.

In one embodiment, photogrammetry system 480 may detect tags (e.g., stickers, markers, etc.) positioned on surfaces of the various radar units (e.g., radar unit 302), vehicle (e.g., vehicle 102), and/or ground around the vehicle, among other possibilities. In this embodiment, photogrammetry system 480 may capture images of the tags from various angles, and may then use the captured images as a basis to determine the various directions (e.g., yaw direction, pitch direction, etc.) of the tagged surfaces (e.g., surface of radar unit 312 or mounting structure 302, etc.) relative to the vehicle (e.g., vehicle 102). This data could be used according to example methods and systems herein to determine orientation adjustments (e.g., pitch offsets, yaw offsets, etc.) for mounting radar units to a vehicle in line with the discussion above. Other configurations for photogrammetry system 480 are possible as well (e.g., tag-less photogrammetry, stereophotogrammetry, etc.). Further, other operations of photogrammetry system 480 are possible as well and are described in greater detail with exemplary embodiments herein.

In some embodiments, computing device 400 could be configured to request the data from the photogrammetry system 480 via the communication interface 470, and responsively receive the data. Further, in some embodiments, computing device 400 could be configured to store the received data in storage devices 440 for later use by processor 410 in accordance with the methods of the present disclosure.

Figure 5:
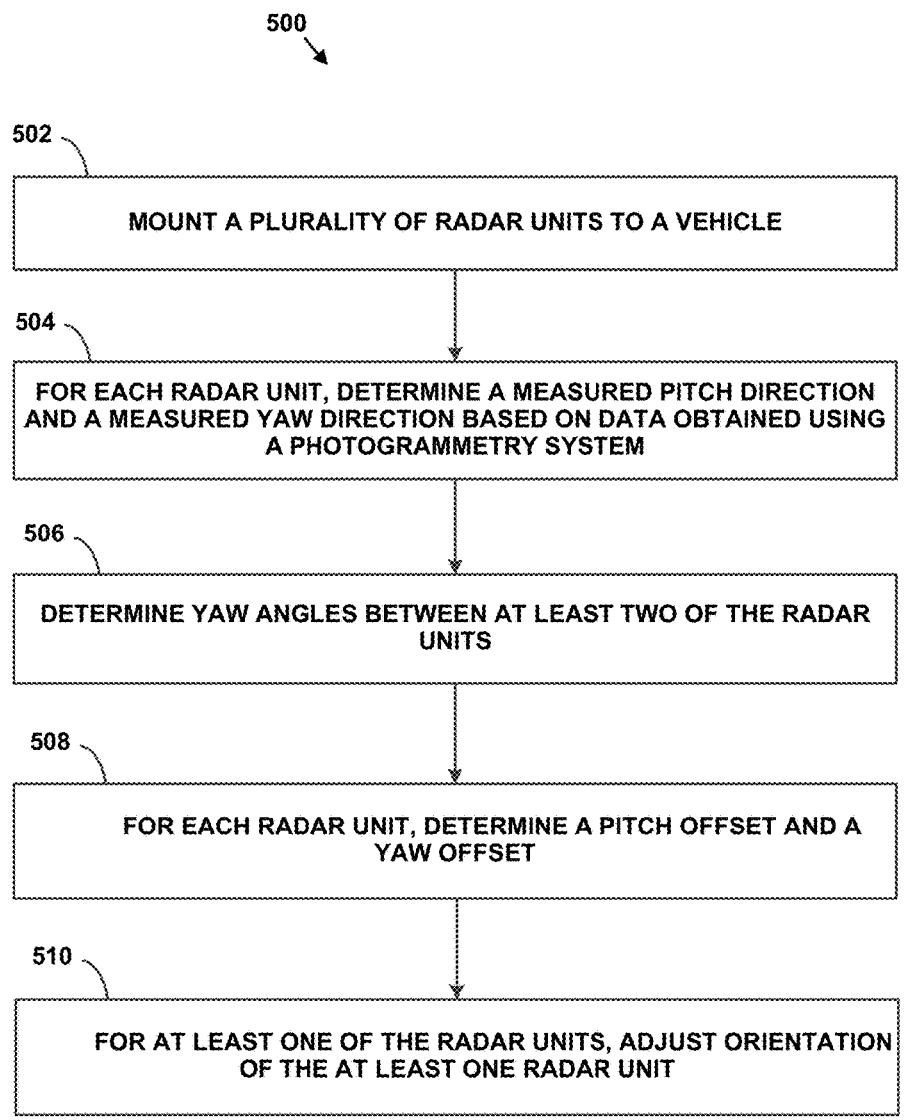
FIG. 5 illustrates a method, according to an example embodiment.

FIG. 5 is an example method for vehicle sensor alignment using photogrammetry. Moreover, the method 500 of FIG. 5 will be described in conjunction with FIGS. 1-4. A vehicular radar system may be configured to interrogate the region around the vehicle via multiple radar units. To interrogate the region around the vehicle, the radar system may transmit the radar beam in a given direction. The transmitted beam may reflect off objects in the region, and the radar unit may receive these reflections. The received reflections may allow the radar system and a computer to determine what objects are located near the vehicle. Not only may objects themselves be determined, but the location (i.e. angle and range to objects) may be determined as well. In order to operate correctly, radar units of the radar system need to both be placed in correct locations and have fairly precise alignment. Accordingly, method 500 could be used for mounting a plurality of radar units to a vehicle in line with the discussion above for FIGS. 1-4.

At block 502, the method 500 includes mounting a plurality of radar units to a vehicle. Each of the radar units could be mounted at a mounting location, such as locations 104, 106, 108, 110 of FIG. 1, and could be configured to scan a surrounding environment of the vehicle, similarly to radar units 202 and 312 of FIGS. 2 and 3. In one embodiment, the mounting at block 502 may be performed by a robotic arm or other electromechanical device that is operated by a computing device such as device 400 of FIG. 4. In another embodiment, the mounting at block 502 may involve providing mounting instructions to a human operator for mounting the radar units. For example, the mounting instructions could be provided via a display device, such as display device 490 of FIG. 4, and may include information such as quantities or positions of shims (e.g., shims 344, 346, 348, 354, 358 of FIG. 3) or bolts (e.g., bolts 324, 326, 328) to use for mounting the radar units.

At block 504, the method 500 includes determining, for each radar unit, a measured pitch direction and a measured yaw direction based on data obtained using a photogrammetry system. For example, with reference to FIG. 4, photogrammetry system 480 could measure the yaw and pitch directions based on captured images of the radar units while the radar units are mounted to the vehicle. Referring back to FIG. 1 by way of example, the photogrammetry system could measure the yaw direction of the radar unit (not shown) mounted to location 104 as the yaw direction 124, and the yaw direction of the radar unit mounted to location 106 as yaw direction 126, etc.

Thus, for example, based on the data obtained at block 504, a computing device may be able to calculate various parameters for each of the radar units. For example, the computing device may be configured to use the photogrammetry measurements to determine the orientation of each mounting structure with respect to each other radar unit or with respect to a reference axis of the vehicle (e.g., axis 112a, 112b, etc., of FIG. 1). As part of the calculations, the computing device may be able to calculate a measured elevational or pitch direction, and a measured azimuthal or yaw direction for each of the radar units. The pitch direction of a radar unit may relate to a rotation of the radar unit with respect to the horizon (i.e. with respect to the plane in which the vehicle travels). The pitch direction may be described by pitch direction 372a of radar unit 312 of FIG. 3, or by yaw direction 362a of the mounting structure 302 of FIG. 3. The yaw direction of the radar unit may relate to a rotation of the radar unit within the plane of the horizon (i.e. within the plane in which the vehicle travels). The yaw direction may be described by yaw direction 372c of the radar unit 312 shown in FIG. 3, or by yaw direction 362c of the mounting structure 302 of FIG. 3.

Accordingly, in some embodiments, determining the measured pitch and yaw directions at block 504 could be performed before the mounting of the radar units at block 502. For instance, the photogrammetry system could determine the orientations of mounting structures where the radar units will be mounted, and then then the radar units could be mounted appropriately in line with the discussion of FIG. 3 (e.g., with certain quantities of shims, etc.).

At block 506, the method 500 includes determining yaw angles between at least two of the radar units. A particular yaw angle between two particular radar units may be determined based on a difference between the measured yaw directions of the two particular radar units. Referring back to FIG. 1 by way of example, the yaw angle between the radar units mounted to locations 104 and 106 could be computed as the difference between yaw direction 124 and yaw direction 126, and the yaw angle between the radar units mounted to locations 106 and 110, could be determined as the difference between yaw direction 126 and yaw direction 130, etc.

At block 508, the method 500 includes determining, for each radar unit, a pitch offset and a yaw offset. Once the measured pitch direction and the measured yaw direction for each of the radar units has been calculated, the computing device may be able to determine a pitch offset and a yaw offset for each of the radar units (or mounting structures, etc.). The pitch offset may be the difference between a predetermined pitch direction the measured pitch direction for example. The predetermined pitch direction may be stored in the computing device or may be received as an input by the computing device, for example.

Further, the yaw offset may be determined based on the difference between a predetermined yaw angle and one or more of the measured yaw angles. Referring back to FIG. 1 by way of example, the yaw offsets could be calculated for each radar unit such that the yaw angle between yaw directions 124 and 126 is approximately equal to the yaw angles between yaw directions 126, 130 and between yaw directions 130, 128 and between yaw directions 128, 124. Alternatively, for example, the yaw offsets could be calculated for each radar unit to achieve certain desired yaw angles between each pair of radar units. Thus, the predetermined yaw angle may be based on the number, orientation, and configuration of the radar units in line with the discussion above.

In some examples, the offset may be measured in degrees. Additionally, in some further examples, one (or more) of the offsets may be determined to be zero degrees in examples where one of the radar units (or associated mounting structures) has a correct alignment with respect to one of the pitch or yaw directions.

In some embodiments, the method 500 may also include determining a sum of the determined yaw angles. In these embodiments, determining the yaw offsets at block 508 may be based also on a difference between a target sum and the determined sum. Referring back to FIG. 1 by way of example, the sum of the yaw angles from arrows 124 to 126, 126 to 130, 130 to 128, and 128 to 124 may be expected to be 360 degrees (i.e., the target sum). However, in some examples, due to measurement errors from the photogrammetry system or due to other manufacturing/assembly variabilities (e.g., locations 104 and 106 may not be symmetrical, etc.), the actual determined sum may be different from the target (360 degree) sum. Thus, in these examples, the method 500 may distribute the difference between the sums among the yaw offsets determined for each radar unit. And thus, continuing with the example of FIG. 1, the various yaw angles after applying the redistributed offsets may more likely be approximately the same. Further, in some examples, the method 500 may also include providing an alert if the difference between the target sum and the determined sum exceeds a threshold. Referring back to FIG. 4 by way of example, the alert could be provided using any of the output interfaces 450, or may be included in mounting instructions (e.g., quantities of shims, etc.) that are provided, for instance, using the display device 490.

At block 510, the method 500 includes for at least one mounting structure adjusting the radar unit based on at least one of the determined pitch offsets and at least one of the determined yaw offsets. In some embodiments, each determined offset may be compared to an offset threshold. In some examples, the offset threshold may be the same for each of the pitch and yaw offsets. However, in other examples, each of the pitch and yaw offsets may have a different threshold offset. In these embodiments, if the determined offset for the pitch and yaw directions is greater than the threshold, the radar unit and may be adjusted such that each of the pitch and yaw offsets are within the respective threshold.

In some examples, a computing device may provide offset adjustment information (e.g., mounting instructions). The information may be provided as a number of degrees and the direction in which the adjustment needs to be made. In another example, the computing device may report quantities of shims that the respective radar unit needs to use with each bolt, in line with the discussion of FIG. 3. Each quantity of shims determined for a respective bolt could be based on a predefined shim thickness as well as the yaw offsets and pitch offsets determined at block 508. The predefined shim thickness could be stored, for example, in data storage 440 of the device 400 or could be input by a user of the device 400. Further, in some examples, the adjustment at block 510 may include providing, with the mounting instructions described at block 502, the determined quantities of shims and/or types of shims that should be used (e.g., having desired thickness values.

In some embodiments, the method 500 may also include providing an alert if one or more of the determined quantities of shims exceeds a threshold. Referring back to FIG. 3 by way of example, if the number of shims used for any of the bolts 324-326 exceeds the threshold, then the bolt may bind with the shims, or may not reach the mounting structure 302 through the radar unit 312 and the shims due to an extent (e.g., length) of the bolt. Thus, the adjustment at block 510 could be based also on each of the determined quantities of shims being less than the threshold.

In some embodiments, the method 500 may also include determining an expected angle between a bolt and a mounting structure based on the determined quantities of shims, and providing an alert if the expected angle exceeds a threshold. Referring back to FIG. 3 by way of example, if the quantity of shims used for the bolt 326 (e.g., one shim 346) is different from the quantities used for any of the other bolts 324, 328, then the expected angle (e.g., angle between dotted line 336 and mounting structure 302) may be affected. And if that expected angle exceeds a threshold (e.g., 3 degrees), then the bolt 326 may bind with the shim 346, the radar unit 312, and/or the mounting structure 302. For example, the bolt 326 may be at an unsuitable angle to enter into the hole 306. Thus, in these embodiments, the method 500 may allow for providing the alert and/or determining a different combination of shims that could achieve the desired offsets while remaining within the threshold angle between each bolt and the mounting structure.

Further, in some examples, the photogrammetry system may be detecting the orientations of the radar units/mounting structures while the radar units are being adjusted. In this example, the photogrammetry system or a computer coupled to the photogrammetry system may provide an alert when the mounting structure was adjusted to bring each of the pitch and yaw offsets within the respective offset thresholds.

Further, in some examples, block 510 may include mounting the radar unit to mounting structures in line with the discussion in FIG. 3. The radar units may be mounted to the mounting structures before or after the radar units are adjusted based on the calculated offsets. Thus, in one example, after determining all the pitch offsets and the yaw offsets at block 508, the radar units may be mounted to the vehicle as described at block 502, and pointed in a direction within the threshold range of the desired direction (i.e. orientation) of the radar unit. In another example, where the radar unit is already mounted before block 510, the radar unit could be re-mounted according to adjustment of block 510 (e.g., with different quantities of shims, etc.).

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method comprising:
   mounting a plurality of radar units to a vehicle;
   for each radar unit, determining a measured pitch direction and a measured yaw direction based on data obtained using a photogrammetry system;
   determining yaw angles between at least two of the radar units, wherein a particular yaw angle between two particular radar units is based on a difference between the measured yaw directions of the two particular radar units;
   for each radar unit:
     determining a pitch offset based on a difference between a target pitch direction and the measured pitch direction of the radar unit;
     determining a yaw offset based at least in part on a difference between a target yaw angle and one of the determined yaw angles; and
   adjusting orientation of at least one of the radar units based on at least one of the determined pitch offsets and at least one of the determined yaw offsets.

2. The method of claim 1, wherein, for one or more of the radar units, determining the yaw offset is based also on a difference between the target yaw angle and another one of the determined yaw angles.

3. The method of claim 1, wherein adjusting the orientation is carried out after determining the pitch offsets and the yaw offsets for all the radar units.

4. The method of claim 1, further comprising:
   determining a sum of the determined yaw angles, wherein determining, for each radar unit, the yaw offset is based also on a difference between a target sum and the determined sum, wherein the target sum is 360 degrees.

5. The method of claim 4, further comprising:
   providing an alert if the difference between the target sum and the determined sum exceeds a threshold.

6. The method of claim 1, wherein mounting the plurality of radar units to the vehicle is via a plurality of mounting structures on the vehicle, wherein each radar unit is coupled to a respective mounting structure via a plurality of bolts positioned through the radar unit and the respective mounting structure, wherein each bolt is coupled to one or more shims positioned between the radar unit and the respective mounting structure, the method further comprising:
   for each bolt coupling the at least one adjusted radar unit to a mounting structure, determining a quantity of shims based on a predetermined shim thickness, the at least one of the determined pitch offsets, and the at least one of the determined yaw offsets,
   wherein adjusting the orientation comprises re-mounting the at least one adjusted radar unit based at least in part on at least one of the determined quantities of shims.

7. The method of claim 6, further comprising:
   providing an alert if one or more of the determined quantities of shims exceeds a threshold, wherein the re-mounting is based also on each of the determined quantities being less than the threshold.

8. The method of claim 6, further comprising:
   for each bolt coupling the at least one adjusted radar unit to the mounting structure, determining an expected angle between the bolt and the mounting structure based on at least two of the determined quantities of shims; and
   providing an alert if the expected angle exceeds a threshold, wherein the re-mounting is based also on the expected angle being less than the threshold.

9. A device comprising:
   data storage storing data generated by a photogrammetry system, the data indicating measured directions of a plurality of radar units mounted to a vehicle; and
   a computational unit configured to perform operations comprising:
     using the data in the data storage to determine, for each radar unit, a measured pitch direction and a measured yaw direction;

determining yaw angles between at least two of the radar units, wherein a particular yaw angle between two particular radar units is based on a difference between the measured yaw directions of the two particular radars;

for each radar unit, determining a yaw offset based at least in part on a difference between a target yaw angle and one of the determined yaw angles;

for each radar unit, determining a pitch offset based on a difference between a target pitch direction and the measured pitch direction of the radar unit; and providing mounting instructions for mounting the radar units, wherein the mounting instructions are based on the determined pitch offsets and the determined yaw offsets.

10. The device of claim 9, wherein the vehicle includes a plurality of mounting structures, wherein the radar units are coupled to the mounting structures via a plurality of bolts, wherein each bolt is positioned through a respective radar unit and a respective mounting structure, wherein the bolt is coupled to one or more shims positioned between the respective radar unit and the respective mounting structure, and wherein the operations further comprise:

for each of the bolts, determining a quantity of shims based on a predetermined shim thickness, at least one of the determined pitch offsets, and at least one of the determined yaw offsets.

11. The device of claim 10, wherein the mounting instructions are indicative of the determined quantities of shims.

12. The device of claim 10, wherein the operations further comprise generating an alert in response to one or more of the determined quantities of shims exceeding a threshold, and wherein the mounting instructions are indicative of the alert.

13. The device of claim 10, wherein the operations further comprise:

for each of the bolts, determining an expected angle between the bolt and the respective mounting structure based on at least two of the determined quantities of shims; and generating an alert in response to the expected angle exceeding a threshold, wherein the mounting instructions are indicative of the alert.

14. The device of claim 9, further comprising an output interface, wherein providing the mounting instructions is via the output interface.

15. The device of claim 9, further comprising:

a communication interface, wherein the operations further comprise:

receiving the data from the photogrammetry apparatus via the communication interface; and storing the received data into the data storage.

16. An article of manufacture including a non-transitory computer-readable medium, having stored thereon program instructions that, if executed by a computing device, cause the computing device to perform operations comprising:

obtaining data generated by a photogrammetry system, the data pertaining to a plurality of radar units mounted to a vehicle;

based on the obtained data, determining measured yaw angles between at least two of the radar units, wherein a particular measured yaw angle between two particular radar units is based on a difference between yaw directions measured for the two particular radar units;

for each radar unit:

determining a yaw offset based at least in part on a difference between a target yaw angle and one of the measured yaw angles;

determining a measured pitch direction based on the obtained data; and determining a pitch offset based on a difference between a target pitch direction and the measured pitch direction.

17. The article of manufacture of claim 16, wherein obtaining the data comprises requesting the data from the photogrammetry system.

18. The article of manufacture of claim 16, wherein obtaining the data comprises retrieving the data from a data storage of the computing device.

19. The article of manufacture of claim 16, wherein, for one or more of the radar units, determining the yaw offset is based also on a difference between the target yaw angle and another one of the determined yaw angles.

20. The article of manufacture of claim 16, wherein the operations further comprise:

providing mounting instructions for mounting the radar units, wherein the mounting instructions are based on the determined pitch offsets and the determined yaw offsets.

* * * * *